United States Patent [19]

Kirkpatrick

[11] Patent Number: 4,628,735
[45] Date of Patent: Dec. 16, 1986

[54] VIBRATING BEAM ACCELEROMETER

[75] Inventor: Gordon S. Kirkpatrick, Renton, Wash.

[73] Assignee: Sundstrand Data Control, Inc., Redmond, Wash.

[21] Appl. No.: 681,564

[22] Filed: Dec. 14, 1984

[51] Int. Cl.⁴ .............................................. G01P 15/10
[52] U.S. Cl. ............................................... 73/517 AV
[58] Field of Search ........... 73/517 AV, 1 D, DIG. 1; 310/329

[56] References Cited

U.S. PATENT DOCUMENTS

| | | | |
|---|---|---|---|
| 3,269,192 | 8/1966 | Southworth, Jr. et al. | 73/517 |
| 3,375,379 | 3/1968 | Royer | 310/9.5 |
| 3,408,515 | 10/1968 | Morse | 310/9.5 |
| 3,440,888 | 4/1969 | Southworth, Jr. et al. | 73/517 |
| 3,479,536 | 11/1969 | Norris | 73/517 AV |
| 3,497,732 | 2/1970 | Royer | 310/9.5 |
| 3,549,414 | 12/1970 | Curran et al. | 117/212 |
| 3,683,213 | 8/1972 | Staudte | 310/9.6 |
| 3,833,999 | 9/1974 | Budych et al. | 29/407 |
| 4,091,679 | 5/1978 | Furasawa et al. | 73/497 |
| 4,126,801 | 11/1978 | Corbett | 310/328 |
| 4,279,159 | 7/1981 | Powell et al. | 73/651 |
| 4,305,298 | 12/1981 | Greenwood | 73/651 |
| 4,348,905 | 9/1982 | Nishimura et al. | 73/654 |
| 4,374,472 | 2/1983 | Nishimura | 73/35 |
| 4,379,403 | 4/1983 | Hattori et al. | 73/35 |
| 4,494,409 | 1/1985 | Kondo et al. | 73/651 |
| 4,517,841 | 5/1985 | Peters et al. | 73/517 AV |

OTHER PUBLICATIONS

Y. Tomikawa et al., "Finite Element Analysis of Displacement at Base Portion of a Quartz Crystal Tuning Fork", *IEEE Transactions on Sonics and Ultrasonics,* vol. SU-26, No. 3, May, 1979, pp. 259-261.

Primary Examiner—Stewart J. Levy
Assistant Examiner—John E. Chapman, Jr.
Attorney, Agent, or Firm—Christensen, O'Connor, Johnson & Kindness

[57] ABSTRACT

The elimination of activity dips in the output of vibrating beam accelerometers has often required an adjustment of parameters in conflict with other design criteria. This problem is overcome by the present accelerometer that comprises a pendulum (48) and a force transducer. The pendulum has first (49) and second (52) ends and a first axis (P) extending between the first and second ends. The pendulum is hingedly connected at its first end to a support (50) along a second axis (F) perpendicular to the first axis. The force transducer comprises an oscillator and a dual beam force sensing element (53) connected between the second end of the pendulum and the support. The point of connection of the force sensing element to the pendulum lies along the first axis. The force transducer is adapted for vibration over a predetermined operating range (44) of beam vibration frequencies. The second end of the pendulum is formed so as to cause the frequencies of pendulum vibration modes to lie outside the operating range, preferably by controlling the mass of the pendulum at the outer edges of the second end so as to cause the normal mode frequency of twisting vibration of the pendulum about the first axis to lie outside the operating range. In another aspect, the pendulum has a width dimension parallel to the second axis, and the width of the pendulum decreases from a point intermediate the ends of the pendulum to the second end.

14 Claims, 8 Drawing Figures

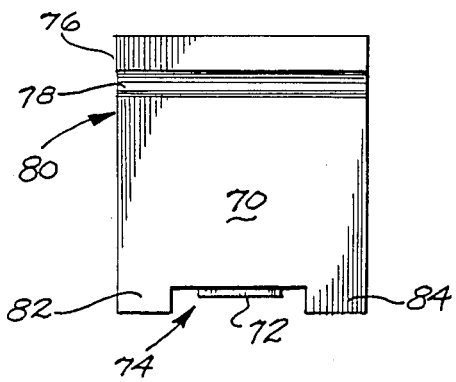
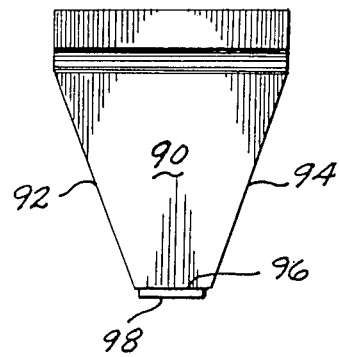
Fig. 5. Fig. 6.
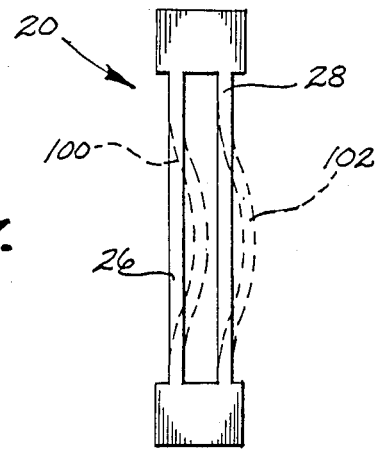
Fig. 7.
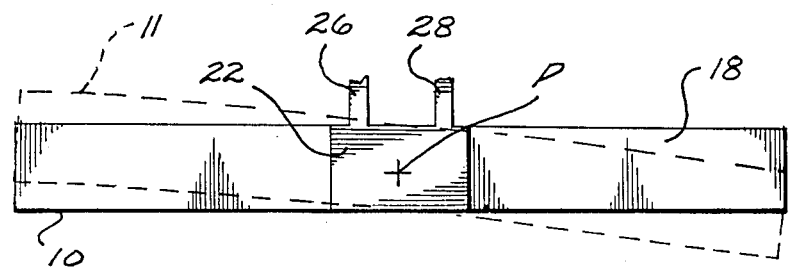
Fig. 8.

VIBRATING BEAM ACCELEROMETER

TECHNICAL FIELD

The present invention relates to accelerometers and, in particular, to vibrating beam accelerometers in which movement of a pendulum is constrained by a force sensing element.

BACKGROUND OF THE INVENTION

In one type of prior accelerometer, a pendulum is suspended from a support by a flexure hinge that constrains movement of the pendulum except movement along the accelerometer's sensitive axis. A force sensing element is connected along the sensitive axis between the pendulum and the support, the force sensing element being attached to the pendulum at the end of the pendulum opposite the flexure hinge. An acceleration along the sensitive axis results in a compression or tension force on the force sensing element. This force is converted into an electrical signal that indicates both the direction and magnitude of the acceleration.

One well known type of force sensing element comprises one or more quartz beams that are forced to vibrate in a particular normal mode by means of electrodes on the beam surfaces and an oscillator circuit connected to the electrodes. The normal mode frequencies of the beams change in response to changes in applied compression or tension forces along the longitudinal beam axes. For a single beam force sensing element, one suitable vibration mode is a flexural mode in which the beam vibrates from side-to-side in a direction normal to the accelerometer's sensitive axis and normal to the lengthwise pendulum axis, i.e., the pendulum axis extending between the end connected to the flexure hinge and the end connected to the force sensing element. For a dual beam force sensing element, a preferred mode of vibration is a flexural mode in which the beams vibrate from side-to-side in the direction described for the single beam element, but in which the beams are 180° out of phase with one another.

One of the advantages of using a dual beam force sensing element in an out-of-phase vibration mode is that the reaction forces of the beams cancel, and as a result no net reaction force is coupled to the pendulum. For any given dual beam configuration, however, there are a number of other normal modes that can be excited. For example, the beam can undergo side-to-side flexural vibration in-phase, rather than out of phase. The desired out-of-phase vibration mode may in general be selected by appropriate electrode placement. However for a typical dual beam accelerometer, there is an in-phase normal mode at a frequency that is sufficiently close to the center out-of-phase normal mode frequency to be within the operating range of the instrument. Factors that tend to enhance the in-phase vibration mode are therefore capable of introducing error into the accelerometer output.

It is not uncommon to find that the output of a vibrating beam accelerometer behaves in a highly nonlinear and unpredictable manner at certain frequencies or over certain narrow frequency ranges. The phenomenon of such nonlinear behavior at a certain frequency is referred to as an activity dip. In the past, the problem of activity dips has typically been avoided by adjusting the mass of the pendulum and other parameters in an effort to avoid overlap between activity dips and the operating range of the accelerometer. However, adjustment of such parameters frequently conflicts with other design criteria. For example, the pendulum mass must also be adjusted based upon the desired scale factor and acceleration range, and to avoid spurious resonances due to vibrational inputs. There has therefore been a long-felt need for a technique of eliminating activity dips that would not conflict with other design criteria.

SUMMARY OF THE INVENTION

The present invention is based upon the discovery that many activity dips can be shifted in frequency out of the operating range of an accelerometer by adjusting the mass at the corners of the pendulum remote from the flexure hinge, i.e., the corners of the pendulum to which the force sensing element is attached. It is believed that such adjustments are effective because they alter the frequencies of pendulum (as opposed to beam) vibrational modes, and in particular of twisting vibrational modes wherein the pendulum oscillates about its lengthwise axis. The present invention therefore provides a convenient means for the designer to avoid activity dips without causing conflict with other design criteria.

In one aspect, the present invention provides an accelerometer comprising a pendulum and a force transducer. The pendulum has first and second ends and a first axis extending between the first and second ends. The pendulum is hingedly connected at its first end to a support along a second axis perpendicular to the first axis. The force transducer comprises an oscillator and a dual beam force sensing element connected between the second end of the pendulum and the support. The point of connection of the force sensing element to the pendulum lies along the first axis, and the force transducer is adapted for vibration over a predetermined operating range of beam vibration frequencies. The second end of the pendulum is formed so as to cause the frequencies of pendulum vibration modes to lie outside the operating range. In a preferred embodiment, the mass of the pendulum at the outer edges of the second end is controlled so as to cause the normal mode frequency of twisting vibration of the pendulum about the first axis to lie outside the operating range.

In another aspect, the present invention provides an accelerometer comprising a pendulum having first and second ends. The pendulum is symmetric with respect to a first axis extending between the first and second ends, and hingedly connected at its first end to a support along a second axis perpendicular to the first axis. The second axis defines the width dimension of the pendulum. The pendulum width decreases from a point intermediate the ends of the pendulum to the second end. The accelerometer also comprises a force transducer comprising an oscillator and a dual beam force sensing element connected between the second end of the pendulum and the support.

BRIEF DESCRIPTION OF THE DRAWINGS

FIG. 5 is a plan view of a second preferred embodiment of a pendulum according to the present invention;

FIG. 6 is a plan view of a third preferred embodiment of a pendulum according to the present invention.

FIG. 7 is a schematic view showing in-phase beam vibration; and,

FIG. 8 is a schematic end view of a pendulum and force sensing element undergoing a pendulum twisting vibration.

DETAILED DESCRIPTION

Figure 1:
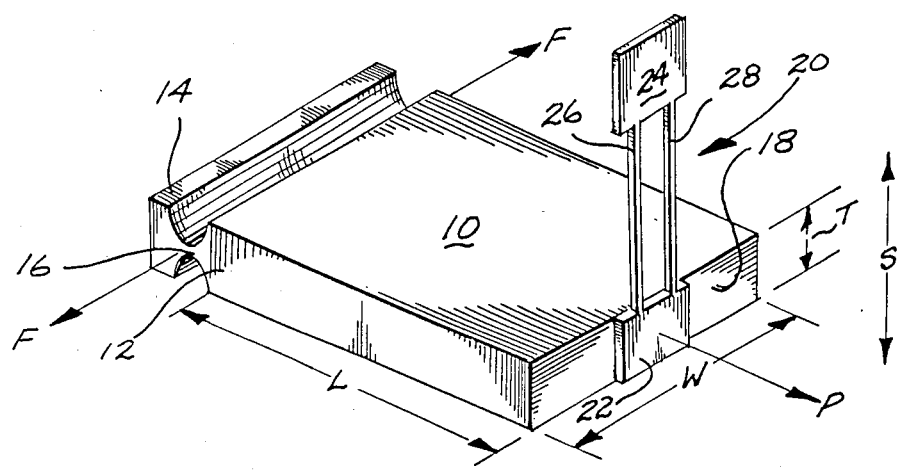
FIG. 1 is a perspective view of a conventional accelerometer pendulum and force sensing element.

FIG. 1 illustrates pendulum 10 and force sensing element 20 of one type of conventional vibrating beam accelerometer adapted to measure acceleration along sensitive axis S. Pendulum 10 comprises a rectangular solid body having length L, width W, thickness T, and central lengthwise axis P. The thickness dimension is aligned with the sensitive axis. One end 12 of pendulum 10 is connected to support 14 by means of flexure hinge 16. A second end 18 of pendulum 10 is connected to force sensing element 20. Flexure hinge 16 constrains movement of pendulum 10 except for pivotal movement about flexure axis F, flexure axis F being normal to axis P. Small movements about flexure axis F correspond to movement of the pendulum along the accelerometer sensitive axis S. Movement along sensitive axis, S, however, is constrained by force sensing element 20. Force sensing element 20, shown schematically in FIG. 1, comprises first end 22 and second end 24 interconnected by beams 26 and 28. End 22 of force sensing element 20 is connected by adhesive or other suitable means to end 18 of pendulum 10, and end 24 of force sensing element 20 is connected to a fixed support. The force sensing element is aligned such that beams 26 and 28 lie along sensitive axis S, and are symmetric in the pendulum width direction with respect to axis P. Pendulum 10 therefore exerts a compression or tension force on beams 26 and 28 in response to acceleration along the sensitive axis.

Figure 2:
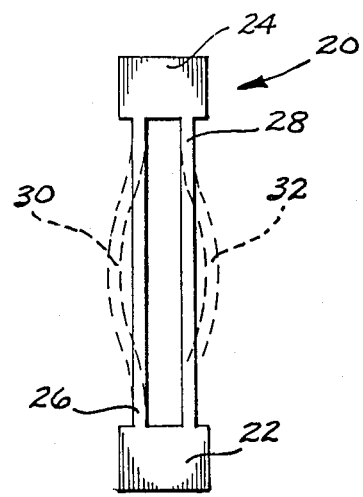
FIG. 2 is a schematic view showing out-of-phase beam vibration.

Force sensing element 20 includes electrodes (not shown) deposited on the surfaces of beams 26 and 28, and an oscillator/driver coupled to the electrodes. The electrodes and driver are preferably adapted to produce the out-of-phase, flexural vibration mode shown in FIG. 2. In this mode, beams 26 and 28 vibrate in the plane of the force sensing element, i.e., in the plane normal to axis P, the vibration being such that the beams are at all times 180° out-of-phase with one another. Thus, for example, when beam 26 has moved to position 30 shown in phantom lines of FIG. 2, beam 28 will have moved to position 32, positions 30 and 32 being equally displaced in opposite directions from the nonvibrating rest positions of the respective beams. The degree of vibration represented by positions 30 and 32 in FIG. 2 has been exaggerated for purpose of illustration.

Figure 3:
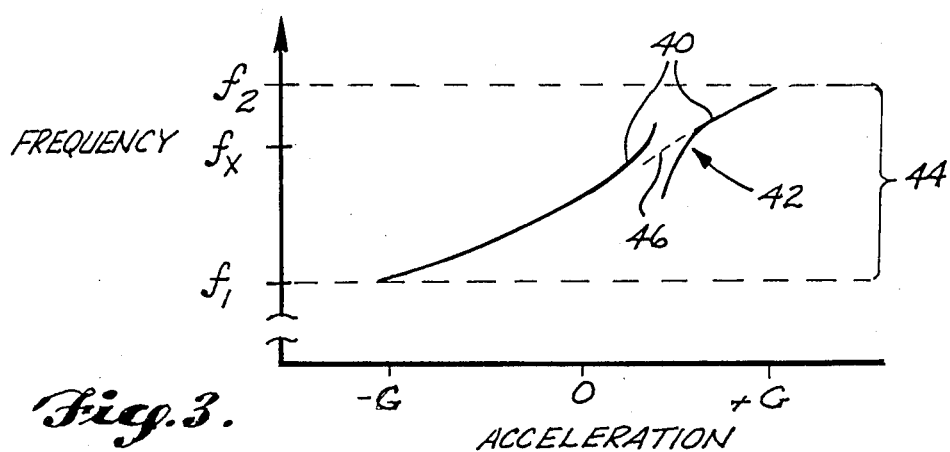
FIG. 3 is a graph depicting variation of frequency with acceleration.

FIG. 3 depicts in graphical form a problem that is frequently encountered in the design of vibrating beam accelerometers. In FIG. 3, it is assumed that the accelerometer has been designed to operate over the acceleration range $-G$ to $+G$ corresponding to beam vibration frequencies of $f_1$ through $f_2$. The variation of vibration frequency over the acceleration range is indicated by curve 40. Curve 40 includes an activity dip 42 centered about frequency $f_x$, $f_x$ being within the operating range 44 defined by frequencies $f_1$ and $f_2$. At frequencies near $f_x$, the beam vibration frequency varies in a highly nonlinear manner with respect to variations in acceleration. The desired variation of frequency with acceleration in the vicinity of activity dip 42 is indicated by dashed line 46. In accordance with the present invention, it has been found that the frequency $f_x$ at which an activity dip such as activity dip 42 occurs can readily be shifted out of operating range 44 by adjustment of the mass distribution of the pendulum. In particular, it has been found that activity dip 42 can readily be shifted in frequency by adding or subtracting mass to the corners of the end of the pendulum remote from the flexure hinge, i.e., to the corners of end 18 (FIG. 1) to which force sensing element (20) is attached.

Figure 4:
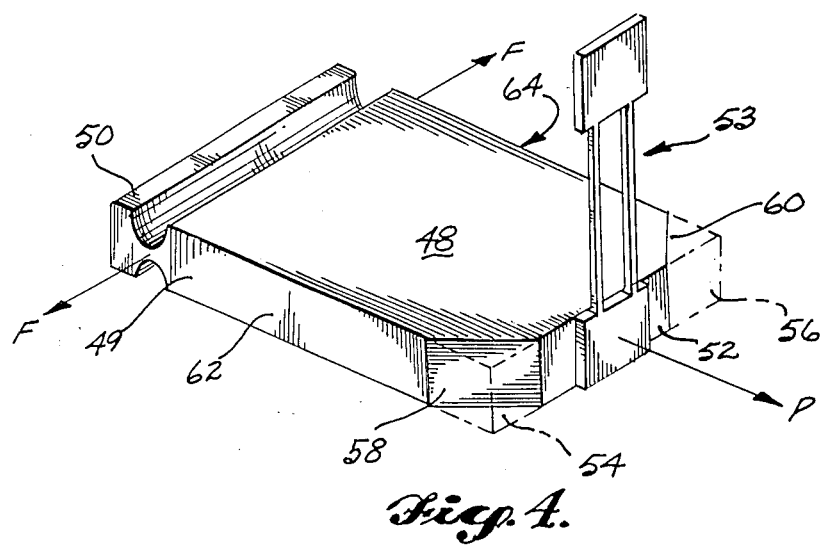
FIG. 4 is a perspective view of an accelerometer pendulum and associated force sensing element according to the present invention.

FIG. 4 illustrates pendulum 48 that has been constructed in accordance with the present invention. Pendulum 48 is similar to pendulum 10 of FIG. 1, and includes end 49 attached to support 50 for movement about flexure axis F, and end 52 to which dual beam force sensing element 53 is attached. However, pendulum 48 is modified, with respect to pendulum 10, by removal of corner portions 54 and 56 at end 52, to produce a pendulum having angled lateral surfaces 58 and 60, surface 58 extending between side 62 and end 52, and surface 60 extending between end 52 and side 64. The amount of mass removed by the removal of corner portions 54 and 56 depends upon the change required to move $f_x$ out of operating range 44. In general, the greater the amount of mass removed at the corners, the greater will be the corresponding increase in frequency $f_x$. It has been found that when the amount of mass removed at the corners is such that end 52 is approximately half the width of pendulum 48 near end 49, activity dips are shifted in frequency by approximately 10 kHz. Since 10 kHz is greater than the entire operating range of many accelerometers, the size of removed corner portions 54 and 56 of FIG. 4 represents the maximum size that will be required for most applications.

If $f_x$ is closer to the lower end ($f_1$) of operating range 44 than to the upper end ($f_2$) of the operating range, then it may be more convenient to move the activity dip out of operating range 44 by decreasing the frequency $f_x$. Such a frequency decrease can be accomplished by adding mass at the corners of the pendulum remote from the flexure axis. Such a pendulum is illustrated by pendulum 70 of FIG. 5. Pendulum 70 is attached at end 74 to force sensing element 72, and is attached at end 80 to support 76 by flexure hinge 78. End 74 of pendulum 70 includes projecting portions 82 and 84 that function to increase the mass of pendulum 70 at the corners of end 74. For many accelerometers, packaging constraints will make it more convenient to form projections 82 and 84 along the lengthwise pendulum dimension, as indicated in FIG. 5, rather than in the width or thickness dimensions. However, projections in the width or thickness dimension would also be effective to decrease the frequency of activity dips.

In all embodiments of the present invention, it will in many cases be desirable to subtract or add mass at the pendulum outer corners without changing the total effective mass of the pendulum. This result can readily be accomplished by varying the thickness of the pendulum to compensate for the mass lost or gained to eliminate the activity dips. In general, it will be desirable to take into account the fact that as mass is subtracted or added at the outer corners, the total pendulum mass changes and the pendulum center of gravity shifts towards the flexure axis.

Referring to FIG. 4, surfaces 58 and 60 are preferably oriented at an angle of about 45° with respect to end 52. A 45° orientation of surfaces 58 and 60 maximizes the amount of mass lost at the corners for a given change in total pendulum mass. Other pendulum shapes may however be used, provided always that the mass change at the corners results in removal of the activity dip from the operating range of the accelerometer. Where a large decrease in corner mass is desirable, maintaining a 45° orientation for surfaces 58 and 60 may result in end surface 52 being too small to mount force sensing element 53. In such a situation it may be preferable to use the pendulum shape illustrated by pendulum 90 of FIG. 6. Pendulum 90 has an essentially trapezoidal shape, with side surfaces 92 and 94 continuously tapering towards end surface 96. In this embodiment, end surface 96 may be selected based upon the width of force sensing element 98.

It is believed that the technique of the present invention is effective to shift the frequency of activity dips because it shifts the frequency of a normal mode in which the pendulum undergoes a twisting vibration about its lengthwise axis, and because such twisting vibration can drive an in-phase mode of beam vibration. FIG. 7 depicts an in-phase mode of beam vibration. In the mode depicted in FIG. 7, beams 26 and 28 are at all times deflected from their rest positions in the same direction, as illustrated by phantom positions 100 and 102. For many force sensing elements, there will exist an in-phase mode, as depicted in FIG. 7, at a frequency within the intended operating range of the instrument. Any factors that tended to cause the force sensing element to vibrate in its in-phase mode would therefore be likely to produce nonlinear operation resulting in many cases in an activity dip. One such factor is illustrated in FIG. 8. FIG. 8 illustrates a twisting mode of vibration of pendulum 10 of FIG. 1 about the central, lengthwise pendulum axis P, the twisting vibration of end 18 of pendulum 10 being generally indicated by position 11 in phantom lines. In this mode, end 12 of pendulum 10 vibrates about axis P 180° out of phase with respect to end 18, but generally with a smaller vibration amplitude due to the constraint applied by flexure hinge 16. It has been discovered that for many pendulums, a natural frequency of such twisting vibration occurs in the operating range of the accelerometer. As illustrated in FIG. 8, the result of such twisting vibration is to rotate end 22 of the force sensing element about axis P, and it is believed that such twisting motion tends to drive the in-phase beam vibration mode shown in FIG. 7. As a result, whenever the desired out-of-phase beam vibration frequency approaches the frequency of pendulum twisting vibration mode shown in FIG. 8, energy is transferred out of the desired beam vibration mode, resulting in nonlinear frequency changes and the activity dips described above.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are as follows:

1. An accelerometer, comprising:
   a pendulum having first and second ends, the pendulum having a first axis extending between the first and second ends and being hingedly connected at the first end to a support along a second axis perpendicular to the first axis, the pendulum having a width dimension parallel to the second axis;
   a force transducer comprising an oscillator and a dual beam force sensing element connected between the second end of the pendulum and the support, the point of connection of the force sensing element to the pendulum lying along the first axis, the force transducer being adapted for vibration over a predetermined operating range of beam vibration frequencies; and
   the second end of the pendulum being formed with a width that is smaller than the width of the pendulum adjacent the first end so as to cause the frequencies of pendulum vibration modes to lie outside the operating range.

2. The accelerometer of claim 1, wherein the pendulum is symmetric with respect to the first axis.

3. The accelerometer of claim 2, wherein the second end of the pendulum is formed so as to cause the normal mode frequency of twisting vibration of the pendulum about the first axis to lie outside the operating range.

4. The accelerometer of claim 3, wherein the normal mode frequency is caused to lie above the operating range by forming the second end with a width that is smaller than the width of the pendulum adjacent the first end.

5. The accelerometer of claim 4, wherein the width of the pendulum decreases from a point intermediate the ends of the pendulum to the second end.

6. The accelerometer of claim 5, wherein the decrease of width from said point to the second end is linear.

7. The accelerometer of claim 6, wherein the decreasing width portion of the pendulum between said point and the second end forms an angle of approximately 45° with respect to the first axis.

8. The accelerometer of claim 7, wherein the width of the second end is approximately half of the width of the first end.

9. The accelerometer of claim 4, wherein the width of the second end is approximately equal to the width of the portion of the force sensing element attached to the second end.

10. An accelerometer, comprising:
    a pendulum having first and second ends, the pendulum being symmetric with respect to a first axis extending between the first and second ends and being hingedly connected at the first end to a support along a second axis perpendicular to the first axis, the pendulum having a width dimension parallel to the second axis, the width of the pendulum decreasing from a point intermediate the ends of the pendulum to the second end, and
    a force transducer comprising an oscillator and a dual beam force sensing element connected between the second end of the pendulum and the support, the point of connection of the force sensing element to the pendulum lying along the first axis.

11. The accelerometer of claim 10, wherein the decrease of width from said point to the second end is linear.

12. The accelerometer of claim 11, wherein the decreasing width portion of the pendulum between said point and the second end forms an angle of approximately 45° with respect to the first axis.

13. The accelerometer of claim 12, wherein the width of the second end is approximately half of the width of the first end.

14. The accelerometer of claim 10, wherein the width of the second end is approximately equal to the width of the portion of the force sensing element attached to the second end.

* * * * *